(12) United States Patent
Nixon et al.

(10) Patent No.: US 7,530,046 B1
(45) Date of Patent: May 5, 2009

(54) CHIP DEBUGGING USING INCREMENTAL RECOMPILATION

(75) Inventors: Gregor Nixon, High Wycombe (GB); Mark Jervis, High Wycombe (GB); Zhengjun Pan, High Wycombe (GB); Gihan De Silva, High Wycombe (GB); Steven Perry, High Wycombe (GB)

(73) Assignee: Altera Corporation, San Jose, CA (US)

( * ) Notice: Subject to any disclaimer, the term of this patent is extended or adjusted under 35 U.S.C. 154(b) by 427 days.

(21) Appl. No.: 11/437,285

(22) Filed: May 18, 2006

Related U.S. Application Data

(62) Division of application No. 10/351,017, filed on Jan. 24, 2003, now Pat. No. 7,076,751.

(51) Int. Cl.
*G06F 17/50* (2006.01)

(52) U.S. Cl. .............................. 716/18; 716/2; 716/16; 716/17

(58) Field of Classification Search ................. 716/2, 716/16, 17, 18
See application file for complete search history.

(56) References Cited

U.S. PATENT DOCUMENTS

| | | | |
|---|---|---|---|
| 4,527,234 A | 7/1985 | Bellay | |
| 4,696,004 A | 9/1987 | Nakajima et al. | |
| 4,788,492 A | 11/1988 | Schubert | |
| 4,835,736 A | 5/1989 | Easterday | |
| 4,847,612 A | 7/1989 | Kaplinsky | |
| 4,873,459 A | 10/1989 | El Gamo et al. | |
| 5,036,473 A | 7/1991 | Butts et al. | |
| 5,058,114 A | 10/1991 | Kuboki et al. | |
| 5,124,588 A | 6/1992 | Baltus et al. | |
| 5,157,781 A | 10/1992 | Harwood et al. | |
| 5,329,470 A | 7/1994 | Sample et al. | |

(Continued)

FOREIGN PATENT DOCUMENTS

EP  0 762 279 A1  3/1997

OTHER PUBLICATIONS

Office Action dated Oct. 22, 2007; U.S. Appl. No. 10/628,508.

(Continued)

*Primary Examiner*—Phallaka Kik
(74) *Attorney, Agent, or Firm*—Weaver Austin Villeneuve & Sampson LLP

(57) ABSTRACT

While debugging, a user chooses an incremental recompile. Internal signals of interest are selected and output pins are optionally reserved. An incremental recompile of the compiled design includes compiling a routing from each internal signal to an output pin. The technology-mapped netlist and placing and routing information corresponding to an original compiled design are saved into a database during full compilation. During debugging, an incremental compiler retrieves this information to build the original routing netlist. The database building, logic synthesis and technology mapping stages may be skipped. New connections are added, fitted to the device, and then the final routing netlist is output into a programming output file (POF) in a form suitable for programming the PLD. The user views the internal signals at the output pins chosen. The user may iterate through this process many times in order to debug the PLD. The debugging assignments may be deleted.

14 Claims, 11 Drawing Sheets

U.S. PATENT DOCUMENTS

| | | | |
|---|---|---|---|
| 5,365,165 | A | 11/1994 | El-Ayat et al. |
| 5,425,036 | A | 6/1995 | Liu et al. |
| 5,452,231 | A | 9/1995 | Butts et al. |
| 5,568,437 | A | 10/1996 | Jamal |
| 5,572,712 | A | 11/1996 | Jamal |
| 5,629,617 | A | 5/1997 | Uhling et al. |
| 5,640,542 | A | 6/1997 | Whitsel et al. |
| 5,661,662 | A | 8/1997 | Butts et al. |
| 5,717,695 | A | 2/1998 | Manela et al. |
| 5,764,079 | A | 6/1998 | Patel et al. |
| 5,821,771 | A | 10/1998 | Pate et al. |
| 5,870,410 | A | 2/1999 | Norman et al. |
| 5,937,190 | A | 8/1999 | Gregory et al. |
| 5,960,191 | A | 9/1999 | Sample et al. |
| 5,983,277 | A | 11/1999 | Heile et al. |
| 6,002,861 | A | 12/1999 | Butts et al. |
| 6,014,334 | A | 1/2000 | Patel et al. |
| 6,016,563 | A | 1/2000 | Fleisher |
| 6,020,758 | A | 2/2000 | Patel et al. |
| 6,104,211 | A | 8/2000 | Alfke |
| 6,107,821 | A | 8/2000 | Kelem et al. |
| 6,157,210 | A | 12/2000 | Zaveri et al. |
| 6,167,561 | A | 12/2000 | Chen et al. |
| 6,182,247 | B1 * | 1/2001 | Herrmann et al. ............. 714/39 |
| 6,195,788 | B1 | 2/2001 | Leaver et al. |
| 6,212,650 | B1 | 4/2001 | Guccione |
| 6,223,148 | B1 | 4/2001 | Stewart et al. |
| 6,247,147 | B1 | 6/2001 | Beenstra et al. |
| 6,263,484 | B1 | 7/2001 | Yang |
| 6,286,114 | B1 | 9/2001 | Veenstra et al. |
| 6,317,860 | B1 | 11/2001 | Heile |
| 6,321,369 | B1 | 11/2001 | Heile et al. |
| 6,377,912 | B1 * | 4/2002 | Sample et al. ................ 703/28 |
| 6,389,558 | B1 * | 5/2002 | Herrmann et al. ............. 714/39 |
| 6,393,591 | B1 | 5/2002 | Jenkins et al. |
| 6,460,148 | B2 | 10/2002 | Veenstra et al. |
| 6,481,000 | B1 | 11/2002 | Zaveri et al. |
| 6,490,717 | B1 | 12/2002 | Pedersen et al. |
| 6,631,520 | B1 | 10/2003 | Theron et al. |
| 6,704,889 | B2 | 3/2004 | Veenstra et al. |
| 6,754,862 | B1 | 6/2004 | Hoyer et al. |
| 6,794,896 | B1 | 9/2004 | Brebner |
| 6,839,874 | B1 | 1/2005 | Fang |
| 6,842,865 | B2 | 1/2005 | Nee et al. |
| 6,891,397 | B1 | 5/2005 | Brebner |
| 6,911,841 | B2 | 6/2005 | Lee et al. |
| 6,973,405 | B1 | 12/2005 | Ansari |
| 7,020,598 | B1 | 3/2006 | Jacobson |
| 7,024,327 | B1 | 4/2006 | Dastidar et al. |
| 2003/0110430 | A1 | 6/2003 | Bailis et al. |

OTHER PUBLICATIONS

Praveen K. Jaini and Nur A. Touba; "Observing Test Response of Embedded Cores Through Surround Logic"; 1999 IEEE.

Nur A. Touba and Bahram Pouya; "Testing Embedded Cores Using Partial Isolation Rings"; 1997 IEEE.

Synplicity, Inc. "Identify ™RTL Debugger", 2003; pp. 1-2.

Altera, Signal Tap Analysis in the Quartus II Software Version 2.0; Sep. 2002; Version 2.1; Altera Corporation.

Marantz, Joshua, "Enhanced Visibility and Performance in Functional Verification by Reconstruction", Proceedings of the 35th Annual Conferene on Design Automation Conference, pp. 164-169, Jun. 1998.

Stroud, Charles et al., "Evaluation of FPGA Resources for Built-in Self-test of Programmable Logic Blocks", Proceedings of the 1996 ACM 4th International Symposium on Field-programmable Gate Arrays, pp. 1-7.

Collins, Robert R., "Overview of Pentium Probe Mode", (www.x86.org/articles/problemd/ProbeMode.htm), Aug. 21, 1998, 3pgs.

Collins, Robert R., "ICE Mode and the Pentium Processor", (www.x86.org/ddi/Nov97/Nov97.htm), Aug. 21, 1986, 6 pgs.

"PentiumPro Family Developer's Manual", vol. 1: Specifications, Intel®Corporation, 1996, 9 pgs.

Xilinx, Inc.; ISE Logic Design Tools: "ChipScope", 18pgs. Nov. 2002.

Office Action; U.S. Appl. No. 10/629,508, filed Apr. 19, 2006.

Office Action; U.S. Appl. No. 10/629,508, filed Apr. 11, 2007.

\* cited by examiner

Logical Netlist

Initial Compilation

Incremental Recompilation

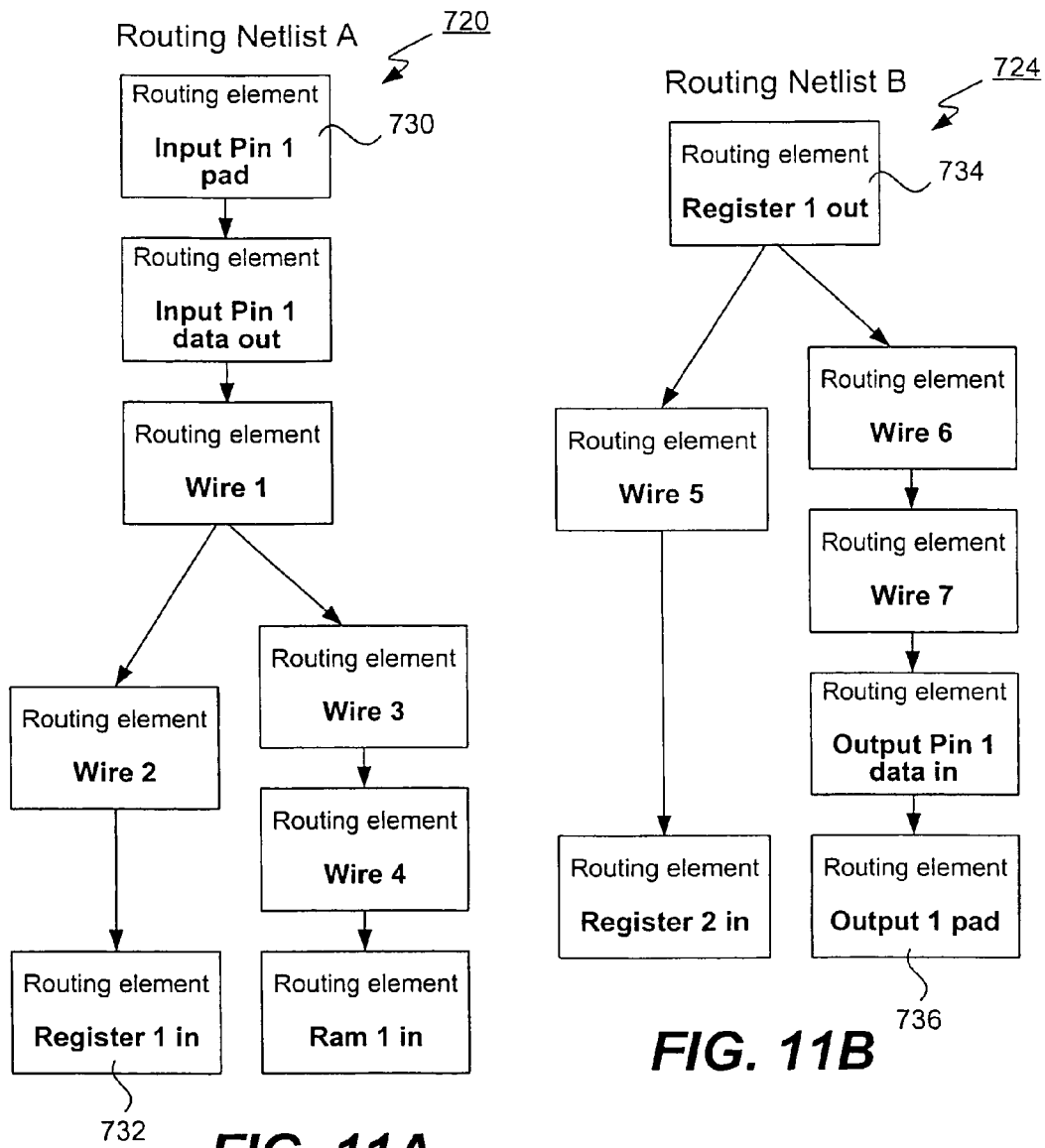
FIG. 11A
FIG. 11B
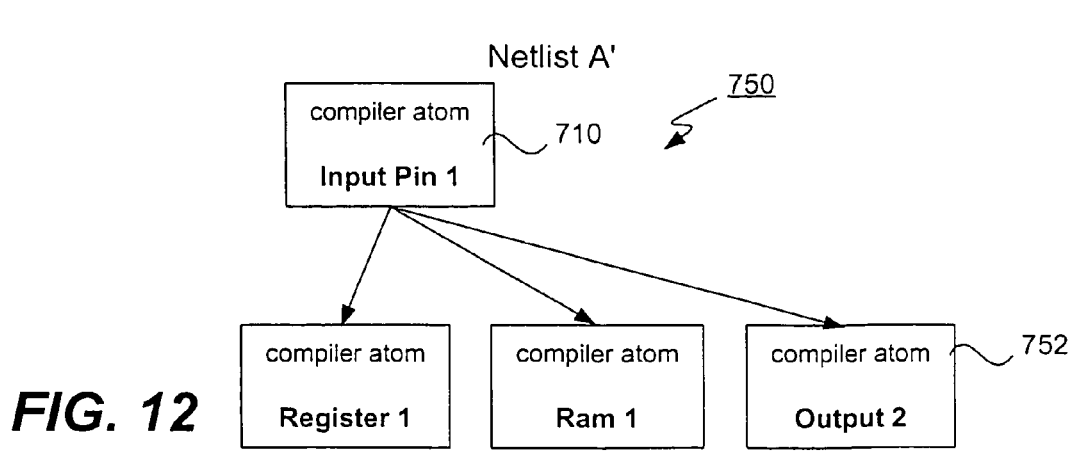
FIG. 12

US 7,530,046 B1

CHIP DEBUGGING USING INCREMENTAL RECOMPILATION

This application is a divisional of U.S. patent application Ser. No. 10/351,017 now U.S. Pat. No. 7,076,751, filed Jan. 24, 2003 entitled "Chip Debugging Using Incremental Recompilation" from which priority under 35 USC 120 is claimed, and which is hereby incorporated by reference.

FIELD OF THE INVENTION

The present invention relates generally to analysis of a hardware device in connection with a computer system. More specifically, the present invention relates to routing signals within a programmable logic device for purposes of debugging.

BACKGROUND OF THE INVENTION

In the field of electronics various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Often, such PLDs are designed and programmed by a design engineer using an electronic design automation tool that takes the form of a software package.

In the course of generating a design for a PLD, programming the PLD and checking its functionality on the circuit board or in the system for which it is intended, it is important to be able to debug the PLD because a design is not always perfect the first time. Before a PLD is actually programmed with an electronic design, a simulation and/or timing analysis may be used to debug the electronic design. Once the PLD has been programmed within a working system, however, it is also important to be able to debug the PLD in this real-world environment.

And although a simulation may be used to debug many aspects of a PLD, it is nearly impossible to generate a simulation that will accurately exercise all of the features of the PLD on an actual circuit board operating in a complex system. For example, a simulation may not be able to provide timing characteristics that are similar to those that will actually be experienced by the PLD in a running system; e.g., simulation timing signals may be closer or farther apart than what a PLD will actually experience in a real system.

In addition to the difficulties in generating a comprehensive simulation, circuit board variables such as temperature changes, capacitance, noise, and other factors may cause intermittent failures in a PLD that are only evident when the PLD is operating within a working system. Still further, it can be difficult to generate sufficiently varied test vectors to stress the PLD design to the point where most bugs are likely to be observed. For example, a PLD malfunction can result when the PLD is presented with stimuli that the designer did not expect, and therefore did not take into account during the design and simulation of the PLD. Such malfunctions are difficult to anticipate and must be debugged in the context of the complete system. Thus, simulation of an electronic design is useful, but usually cannot debug a PLD completely.

One approach to debugging a hardware device within a working system is to use a separate piece of hardware equipment called a logic analyzer to analyze signals present on the pins of a hardware device. Typically, a number of probe wires are connected manually from the logic analyzer to pins of interest on the hardware device in order to monitor signals on those pins. The logic analyzer captures and stores these signals for later viewing and debugging.

As an external logic analyzer may not always be optimal, embedding a logic analyzer within the hardware device is another technique used. For example, U.S. Pat. No. 6,182,247 entitled "Embedded Logic Analyzer For A Programmable Logic Device" discloses such a technique, and U.S. Pat. Nos. 6,286,114 and 6,247,147 disclose enhancements. In addition, viewing internal nodes in a device may be performed as disclosed in U.S. patent application Ser. No. 09/802,480. These techniques may fully recompile the electronic design before debugging can be performed. Embedding a logic analyzer into a design is also a technique used in the product "ChipScope ILA" available from Xilinx Inc., of San Jose, Calif. The product "ChipScope Pro" also available from Xilinx uses logic cores built directly into a PLD to allow a user to access internal signals and nodes for debugging.

Once an electronic design for a hardware device such as a PLD has been compiled, though, it may not be desirable to fully recompile the design in order to facilitate a debugging technique. For example, once a design has been compiled and programmed into a hardware device, the hardware may not function as intended even though a simulation of the design functioned correctly. If an internal signal needs to be debugged, existing techniques require the user to change the design to route the signal to an I/O pin of the hardware device (or require the user to program the signal into an internal logic analyzer), and then execute a full recompile. Or, due to hardware constraints, an internal signal may need to be routed from a current output pin to a different output pin to enable debugging; again, the design is changed and a full recompile is performed.

The recompilation may often re-place and re-route the design to fit in the new internal connections. This full recompilation may take longer than an engineer would wish to wait; depending upon the device, compilation can take anywhere from one hour to one-half day, or even as long as two days. The re-place and re-route may also affect the signal that is being investigated. For example, the bug being investigated might disappear, or could change. Further, other problems may be introduced into the design, or the maximum frequency of the design may be adversely affected.

For these reasons, it is not always desirable to execute a full recompile in order to view an internal signal for purposes of debugging. What is desired is the ability to view an internal signal in an electronic design without affecting the current placement and routing, without breaking timing constraints, and without having to recompile the entire design.

SUMMARY OF THE INVENTION

To achieve the foregoing, and in accordance with the purpose of the present invention, a signal routing technique is disclosed that enables debugging of a compiled electronic design without the need for a full recompilation.

The present invention provides the ability to incrementally route out signals from within a previously placed and routed design to pins on a hardware device for debugging purposes. This facility is useful when a design simulates correctly, but does not function as intended in hardware. Under the present technique, existing placement and routing is not disturbed by the additional signal routing. Because a full recompile is not needed, the problem being investigated is not disturbed and no new problems are introduced. And because compilation is incremental, it takes a very small amount of time relative to the original compilation time. For example, an incremental recompile may take 10% of the time needed for a full recompile. Other advantages include: the capability to handle the routing of many internal signals of interest simultaneously, and the capability to remove such routing when debugging is complete.

Using an EDA tool to program and debug a PLD, a user may choose to use the present invention when a bug is identified in a compiled design. Rather than having to change the design and perform a full recompile (which can take days), the user chooses an incremental recompile. Internal signals of interest to aid in debugging are selected, and output pins are optionally reserved. The user then performs an incremental recompile of the compiled design which includes compiling a routing from each internal signal to an output pin. A full compile is not needed. Once the modified design has been programmed into a PLD, the user may then view the internal signal at the output pin (typically with a logic analyzer) to aid in debugging the PLD.

In one embodiment, the technology-mapped netlist and placing and routing information corresponding to the original compiled design are saved into a database during the full compile. The incremental compiler retrieves this information from the database during the incremental recompile to build the original routing netlist. Thus, the database building, logic synthesis and technology mapping stages may be skipped, saving valuable time. The new connections are added, fitted to the device, and then the final routing netlist is output into a programming output file (POF) in a form suitable for programming the PLD. The user may iterate through this process many times in order to debug the PLD. Once done, the debugging assignments may be deleted, and the user preferably performs a final full compilation and test to finish the design.

BRIEF DESCRIPTION OF THE DRAWINGS

The invention, together with further advantages thereof, may best be understood by reference to the following description taken in conjunction with the accompanying drawings in which:

FIG. 11 is the routing netlist resulting from the compilation of the netlist of FIG. 10 and includes two routing netlists.

FIG. 12 illustrates the technology-mapped netlist of FIG. 10A in which it is desired to view an input signal on the output of a hardware device.

DETAILED DESCRIPTION OF THE INVENTION

In order to develop an electronic design for programming a hardware device such as a programmable logic device (PLD), a programmable logic development system is used. As used herein, "electronic design" refers to designs for circuit boards and systems including multiple electronic devices and multi-chip modules, as well as integrated circuits. For convenience, the following discussion will generally refer to "integrated circuits", or to "PLDs", although the invention is not so limited.

Programmable Logic Development System

Figure 1:
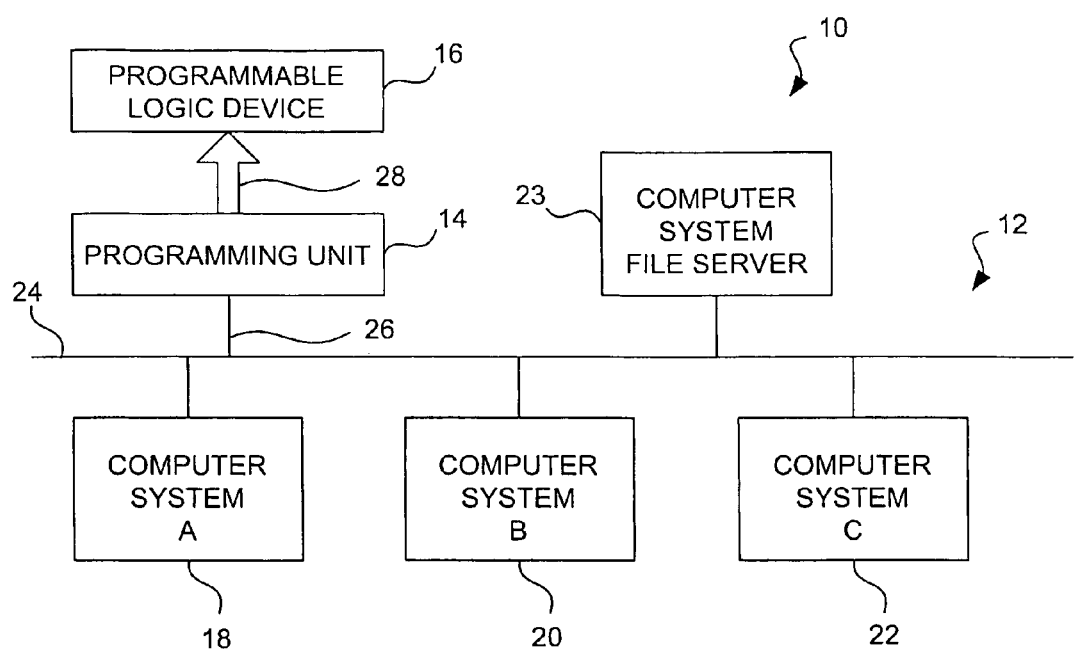
FIG. 1 is a block diagram of a programmable logic development system according to one embodiment of the present invention.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22 and computer system file server 23 all connected together through a network connection 24. Computer network 12 is connected via a cable 26 to programming unit 14, which in turn is connected via a programming cable 28 to the PLD 16. Alternatively, only one computer system might be directly connected to programming unit 14. Furthermore, computer network 12 need not be connected to programming unit 14 at all times, such as when a design is being developed, but could be connected only when PLD 16 is to be programmed.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from Altera Corporation of San Jose, Calif. PLD 16 may be present in a system or in a programming station. In operation, any number of engineers use computer network 12 in order to develop programming instructions using an electronic design automation (EDA) software tool. Once a design has been developed and entered by the engineers, the design is compiled and verified before being downloaded to the programming unit. The programming unit 14 is then able to use the downloaded design in order to program PLD 16.

For the purposes of debugging a PLD according to an embodiment of the present invention, any of the computers shown or others may be used by an engineer to compile a design. Furthermore, programming cable 28 may be used to receive data from the PLD, or a separate debugging cable may be used to directly connect a computer with device 16. Such a programmable logic development system is used to create an electronic design. A user creates a design by specifying and implementing functional blocks, as will now be described in the context of an exemplary design methodology.

Design Methodology

Figure 2:
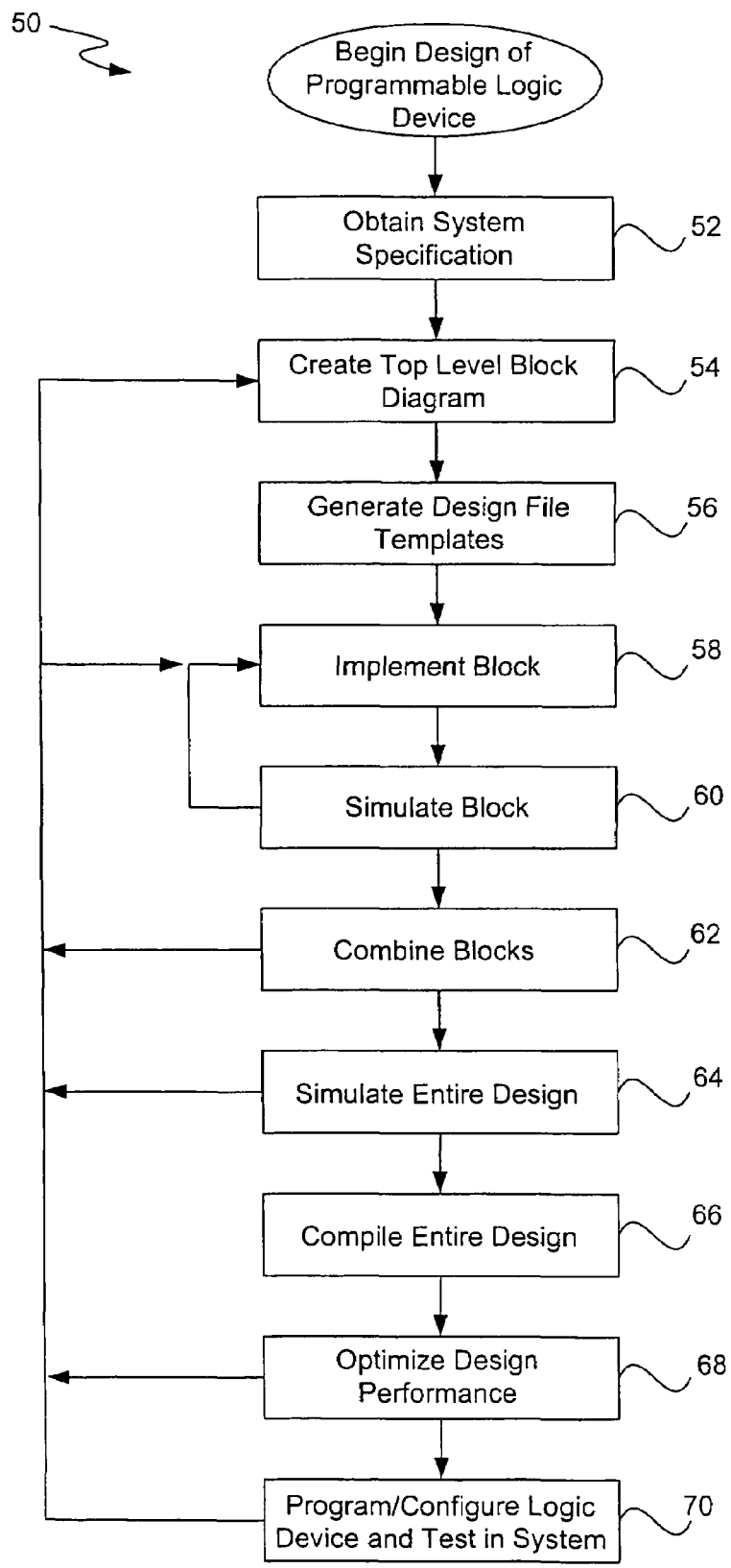
FIG. 2 is a flowchart of a design methodology used to design a programmable logic device according to one embodiment of the present invention.

FIG. 2 shows a design methodology 50 for using a system specification in order to develop a design with which to program a PLD. It should be appreciated that the present invention may be practiced in the context of a wide variety of design methodologies. By way of example, the techniques of the present invention work well by using an electronic design automation (EDA) software tool within the framework of the methodology of FIG. 2.

In step 52 a system specification for the PLD to be programmed is obtained. This specification is an external document or file that describes, for example, the device pin names, the functionality of each of the pins, the desired system functionality, timing and resource budgets, and the like.

Once the system specification is obtained, creation of a design using functional block diagrams is begun. In step 54 a top-level block diagram is created in which connections between lower-level design blocks are specified. In this block, the target device, speed grade, and key timing requirements may be specified. Those skilled in the art will recognize that this top-level block may also include blocks that have already been developed or implemented or that have been obtained from a third party provider. This top-level block may also be converted into an HDL file, or the like, for use in other related design tools, such as an external simulator.

Step 56 includes generating design file templates with the EDA tool for all blocks present in the top-level block diagram of step 54. After the designer has created a block which has not yet been implemented, the system may generate a design file template. Such templates may display a block in a window format including, for example, a title or date around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block. The user need only take the template and add the small portion of VHDL syntax required to implement his function. Normal design, such as VHDL or other IEEE standard, requires large amounts of text to adequately set up the design block.

Those skilled in the art will recognize that design file templates such as these can be used as starting points for the design of the structural or functional entities needed by the design. Thus, a design file template may serve as a reusable object for different instances of a block in one or more designs. More importantly, design file templates will be employed to reduce the amount of labor that the designer must expend to generate the logic in the blocks. In one embodiment, the generation of the design file templates is done in such a way that the templates can be updated later if the top-level block diagram changes.

Next, in step 58, each of the blocks of the top-level block is implemented using the EDA tool. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during step 58. This sequence illustrates a style of design in which an engineer first designs, then compiles and simulates, and then returns to design again if the simulation results are not satisfactory. In another style, an engineer may iterate through a number of designs followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 60, 62, 64, 68 and 70 may also lead back to this block implementation step 58 for additional implementation necessitated by later changes in the design.

In step 60 a block is simulated functionally at the source level using a behavioral simulator and vectors generated by using a VHDL or Verilog test bench, for example. The simulation results can then be displayed or otherwise presented or recorded as waveforms, text or annotated onto the source files. The designer may also return to step 58 to implement a block again. Also, at this point a block may be compiled or a timing analysis performed.

Once the designer is satisfied with the simulation results, in step 62 the block is combined with other blocks and the resulting group is simulated together. In some cases, it may be useful to complete a full compilation to provide critical resource and timing information. Also, output simulation vectors from one block may become the input simulation vectors to the next block. The designer may also return to step 54 to modify the top-level block or to step 58 to implement a block again.

Next, in step 64, the entire design is simulated functionally at the source level using a behavioral simulator. Preferably, the top-level block diagram is fully specified before simulation and shows complete design connectivity. Vectors can be generated using a VHDL or Verilog test bench. Again, the simulation results can be displayed either as waveforms or annotated onto the source files. The designer may also return to step 54 to modify the top-level block or to step 58 to implement a block again. In step 66 the entire design is compiled into a file containing the information needed to program a PLD to implement the user's design.

A wide variety of compile techniques may be used depending upon the type of design being created. By way of example, a few examples of compilation are presented below. For a PLD, compilation typically includes the steps of: initialization; database building; logic synthesis; technology mapping; fitting (placing and routing); assembly; and timing analysis. A simulation may also be performed as part of compilation or afterward. For a traditional integrated circuit design with a custom layout, compilation also includes a layout version schematic, a design rule checker and simulations. For integrated circuit design using a high level design tool, compilation includes synthesis from a language such as VHDL or Verilog, automatic fitting and simulations. For printed circuit boards, compilation includes automatic fitting, design rule checking, lumped parameter extraction and simulation. Of course, other types of compilation and variations on the above are possible.

Following compilation, in step 68 the designer determines if the performance goals for the design have been met by reference to the timing analysis and any simulation. In addition, other analysis tools such as a design profiler or a layout editor can be used to further optimize the design. Preferably, optimization is not performed prior to step 68 because full compilation is usually required to establish the location of one or more critical paths within the design. The designer may also return to step 54 to modify the top-level block or to step 58 to implement a block again.

Next, in step 70 the device is programmed using programming unit 14 and tested in the system. Again, the designer may also return to step 54 to modify the top-level block or to step 58 to implement a block again. While methodology 50 presents a top-down design process, it may also be used to support a bottom-up type methodology. Now that a general design methodology has been described by which an engineer may develop a design for a PLD, a technique for debugging internal signals will be discussed.

General Flow

As described above, compilation steps may vary depending upon whether one is compiling a design for a PLD, a custom integrated circuit design, or for a printed circuit board. For ease of explanation, the below description uses the example of compilation performed for a PLD. The general steps used in such a compilation are as follows.

In initialization the compiler decides, based on design/settings changes made by the user, which parts of the compilation flow need to be executed and spawns the appropriate processes. During database building, a database is constructed, if one does not exist already, or restored to memory if a database does exist from a previous compile. Next, in logic synthesis, a hardware description language is analyzed and then a technology-mapped netlist (or "logical netlist") is output (technology mapping). Next, in a fitting stage, the technology-mapped netlist is input to the fitter which produces a routing netlist indicating the physical routing in an actual hardware device. This stage is also known as "placing and routing." Next, an assembler takes the routing elements and routing netlist from the fitter and outputs a bit stream which is saved into a file typically known as the programming output file (POF). A compiler may also perform timing analysis in which the delay paths in a design are calculated to provide the signal delays for the design. Timing analysis helps the user ensure that the timing constraints for the design are still satisfied.

Figure 3:
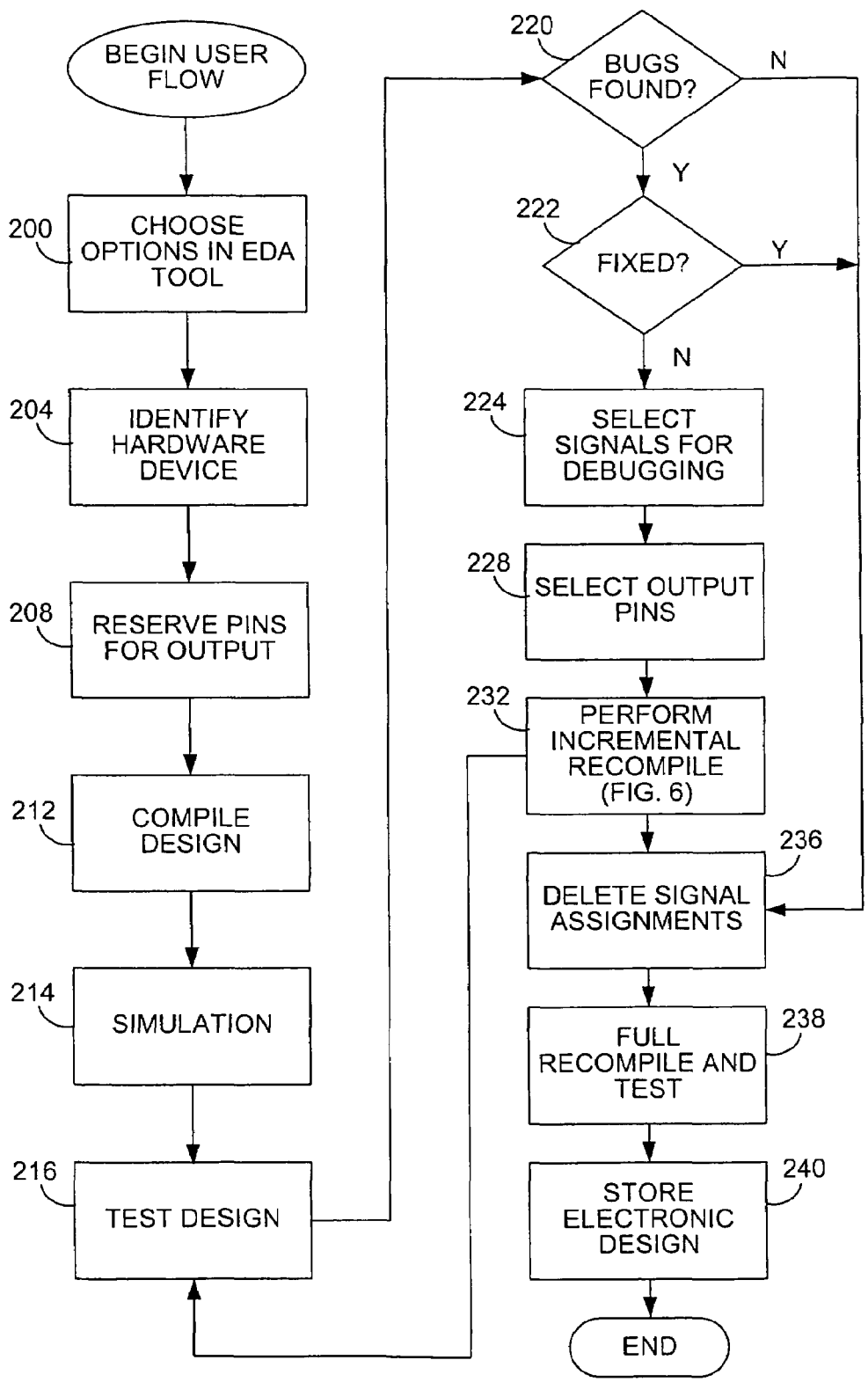
FIG. 3 is a flow diagram describing one embodiment of the invention in which a user debugs a PLD.

FIG. 3 is a flow diagram describing one embodiment of the invention in which a user debugs a PLD. For purposes of this discussion, we assume that a user has created an electronic design using any of a variety of electronic design automation (EDA) tools. EDA tools are available from such companies as Altera Corporation, Xilinx, Inc., Synopsis, and Mentor Graphics.

In step 200, the user may choose to enable options in the EDA tool to allow a recompile to be performed much faster. For example, the user chooses a "save netlist" option that allows the technology-mapped netlist produced during the compile to be saved onto the user computer. Saving of the technology-mapped netlist allows a future recompile to skip the stages of database building and logic synthesis when a later recompile is performed. Use of this option allows the recompile to save considerable time, and although not required, is the preferred embodiment of the invention. Should a user not wish to save the technology-mapped netlist, or if there is not enough space on the user computer, the user may choose not to enable this option. Other options that may be set at this time include the selection of the level of optimization of the compiler.

In step 204, the user inputs to the EDA tool the specific hardware device that will be programmed so that pin assignments can be made. (Alternatively, the user may make assignments directly into a compiler's settings file). In an alternative embodiment, the user may choose not to specify a particular hardware device but may instead choose a general device family and let the EDA tool automatically select an appropriate device from within that family (for example, by using the smallest suitable device). For example, a user may specify any of the APEX, Stratix or Excalibur device families available from Altera Corporation and have the EDA tool select from a device within that family.

In step 208, the user may choose to reserve particular pins on the device to output the internal signals to be analyzed. For example, should the user wish to analyze three internal signals, three pins of the PLD may be reserved at this time. Reserving these pins means that in the course of the fitting stage of a compile, these pins would not be used for placing and routing and will be saved for the debugging output. A reserved pin is reserved even though it might not appear in the design file. This reserve step is optional, should a user not reserve pins in this step, the compiler will choose appropriate pins during the course of a compile to which the internal signals will be output. Alternatively, a user may choose to make pin assignments before compilation takes place to specify which pins should perform which function for the device. If this technique is used, then the compiler would, by default, need to use those unspecified pins to route out internal signals for debugging.

In step 212, the user commands the EDA tool to perform a full compile of the electronic design. If the user had previously set the "save netlist" option in step 200 above, then the technology-mapped netlist along with placement and routing information is saved into a database. This database may be any storage medium associated with the user's computer (preferably) or storage located on a network. In step 214, the user may perform simulation using the EDA tool or another specialized software tool. At this stage of the process, the electronic design may simulate correctly, however, it is possible that a device that simulates correctly may not function correctly in the actual hardware device. Alternatively, a user may perform a simulation part way through the compile process as is known in the art.

In step 216, the user programs the hardware device with the compiled electronic design and tests the design in the hardware device. Testing may occur in a variety of ways including using an external logic analyzer connected to pins of the device, or by using an internal logic analyzer such as is described in the above-referenced U.S. patents and patent applications. If no bugs are found, then control moves to step 236.

Assuming, though, that a bug is found in the design, in step 224 the user selects internal signals to be debugged using the EDA tool. The user selects an internal signal (or "node") to be debugged. Although almost any internal signal can be selected for debugging, there may be limitations on certain signals. For example, signals present in the original electronic design but not appearing in the final "post compilation" routing netlist may not be available for debugging. Also, a bus or group of signals may not be able to be routed to a single output pin and signals from certain components such as carry chains, cascade chains, and PLL clocks may not be physically able to be routed to an output pin. In one embodiment, the user is responsible for selecting an appropriate signal for debugging (although the EDA tool may provide a warning message if an inappropriate signal is chosen). Alternatively, the EDA tool may filter the available nodes such that only appropriate nodes for output are presented to the user, or the user may use specific filters to be used when selecting a node. One embodiment for node selection is explained below with reference to FIGS. 4 and 5.

If the user wishes to perform several minor design debugging iterations a flag may be set. For example, when signals are selected in step 224 an "automatic route" compiler setting may be set to "active" to always route out the internal signals of interest even during a full compilation. This setting may also be set in step 200 or at another appropriate time. When active, this setting will connect the chosen signals even during a full compilation. This technique saves time if the user is performing many compilations as part of debugging a design. During such a compilation when this setting is active, the compiler checks to ensure that the source nodes still exist and that they have not been renamed. If the user has made a design change such that the specific nodes no longer exist and do not appear as post-compilation nodes, the compiler generates a warning.

In step 228, the user selects output pins on which to view the selected internal signals. One embodiment for output pin selection is explained below with reference to FIGS. 4 and 5. For example, a user may use a user interface to select previously reserved pins for output or select unused pins for outputs. These pins may have been previously selected and reserved in step 208. If not, the user selects one output pin per signal. Certain output pins may be unavailable for use; these output pins may be flagged in a user interface, may generate warning messages when chosen, or the EDA tool may filter out such output pins such that they are not presented to the user for a possible selection. For example, certain dedicated pins may be unavailable for selection and standard I/O restrictions may prohibit two types of pins from being placed next to one another which may limit the choice of an output pin. Examples of dedicated pins that might be unavailable for use include dedicated clocks, fast pins, dedicated pins, PLL pins and clock enable pins. In a preferred embodiment, the EDA tool filters out such unavailable output pins and only presents those available output pins to the user for selection.

In an alternative embodiment, the user may choose the input to an embedded logic analyzer as the "output" pin to which the internal signal is routed. The embedded logic analyzer may be any of those previously mentioned, or a similar device. Or, the selected signals may be routed to other internal locations.

The signal selected for routing may already by routed to a given output pin yet the user wishes the signal be routed to a different output pin for ease of debugging. In this situation, the internal signal is also routed to the newly chosen output pin. The path to the previous output pin may be left in place. Should it be desired to delete the older routing, then an incremental compilation can be performed to remove that routing.

A pair of an internal signal and an output pin are also referred to as a "source/sink" pair. For each source/sink pair specified in the above steps (either via a GUI dialog box, script or other input), the EDA tool adds the following assignments to the chip section of a compiler settings file:

pin name: SIGNAL_PROBE_SOURCE="source node name"

pin name: LOCATION=PIN LOCATION pin name: RESERVE_PIN="AS SIGNALPROBE OUTPUT"

pin name: SIGNAL_PROBE_ENABLE=on/off

In the case of reserving a pin, preferably only the LOCATION, RESERVE_PIN and SIGNAL_PROBE_ENABLE assignments are written to the compiler settings file. The interface between the GUI and the back-end process is via these above assignments for each source/sink pair, methods for detecting whether the "save netlist" option is chosen (or a TCL script equivalent), and two general compiler settings:

SIGNAL_PROBE_AUTO_ASSIGN=number of random assignments;

SIGNAL_PROBE_COMPILE=on/off;

The first general setting is used in regression testing to quickly create a large number of random source/sink pair assignments, while the second is set when the "automatic route" setting is selected. Once the appropriate assignments are created, the tool is ready to perform an incremental recompile.

In step 232 the user commands the EDA tool to perform an incremental recompile as is discussed below with reference to FIG. 6. Once an incremental recompile is performed, the user again programs the device and tests it as discussed in step 216 and on. If all local routing resources are used such that a signal cannot be routed to an output pin, the compiler may provide a warning and continue with further compilation. Preferably, to not adversely effect the time to compile, the existing routing is left unchanged.

Returning to discussion of when no bugs are found in step 220, it is preferable that the user then execute a full recompile and test the design in hardware one last time before releasing the debugged electronic design. As the user may have fixed the problem previously in step 222, this fix may involve changing the original design or changing placing and routing. Thus, it is preferable to perform an additional incremental recompile to verify that these changes had not effected the design. In step 240, the final, compiled electronic design is stored for later use or is programmed into a hardware device.

But once debugged in step 220, it is possible for the user to release the electronic design without removing the debugging signal assignments and without testing one last time. Preferably, though, in step 236 the added signal assignments for debugging are deleted (or disabled) from the design. Then in step 238 a full recompile and test are performed one last time (for example, starting from step 212) to ensure that not only is the design double checked, but also to ensure that the deletion of the debugging assignments did not introduce new problems. As part of step 236, the dedicated output cells and the additional routing can be removed by either disabling or deleting all assignments. Disabling the assignments will still leave the output pins reserved in the compiled design, whereas deleting the assignments will completely remove them.

User Interface Examples

Figure 4:
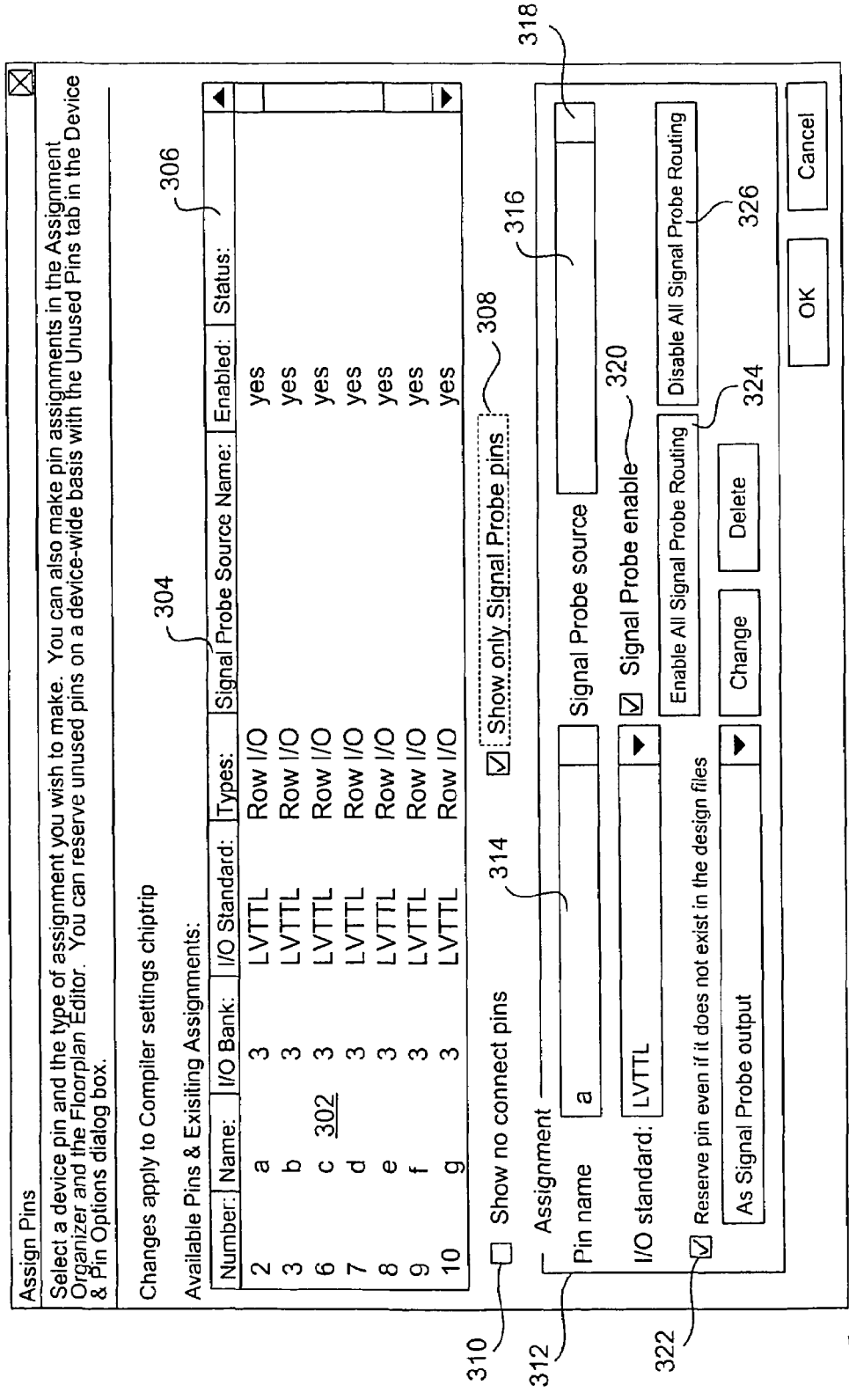
FIG. 4 is an example of a pin assignment dialog box according to one embodiment of an EDA tool user interface.

FIG. 4 is an example of a pin assignment dialog box 300 according to one embodiment of an EDA tool user interface. Dialog box 300 is used to reserve output pins before a first compilation, select unused or previously reserved output pins after an initial compilation, select signal source nodes, enable/disable assignments, and perform other functions related to signal routing. The dialog box may be used in conjunction with step 200, 208, 224, 228, 236 or at another appropriate time. Reference is made occasionally to "SignalProbe," a particular name used with the incremental recompile technique.

Window 302 lists pin numbers and names, types, a source name 304, a status 306 and other related information. After a first compilation, previously reserved pins and any unused pins appear in the window. For each of these pins, a source node can be selected by either typing the name directly into the source window, or by using a node finder dialog box. Alternatively, the user may make assignments directly in a compiler settings file (having an extension of ".csf") or in ways known to those of skill in the art. If the pin is assigned to a particular source node, that information is listed in column 304. Status 306 shows the routing status of a current assignment: "routed"—if the signal is currently successfully routed; "not routed"—if the assignment was disabled on the last incremental compilation; "failed to route"—if the routing for the signal failed on the last incremental compilation; or "need to compile"—if the assignment has changed since the last incremental compilation. It is possible that signals may fail to be routed due to local routing resources being fully utilized.

Check box 308 indicates to show only those pins that either have the status of reserved output debugging pins, or are unused and are of a supported pin type. Check box 310 is used for pins that the user cannot use in their design. If a pin is selected in window 302, then information regarding an assignment to that pin appears or may be selected in window 312. The pin name appears in box 314. An internal node source (i.e., a signal to be routed out) may be entered or selected in box 316. Browse button 318 opens a node finder dialog box to allow selection of a node as will be described in FIG. 5.

Check box 320 when checked automatically enables check box 322 to reserve the pin as an output of the internal signal selected. Buttons 324 and 326 enable all routing or disable all routing as shown. In one embodiment, these buttons are only enabled when box 308 is checked. When one of these buttons 324 or 326 is pressed, it automatically changes the "Enabled Status" of all pins that have been reserved to either yes or no, respectively. The "Add" button is pressed to set a new assignment; when an existing assignment is selected in the available pins window the "Add" button will change to say "Change." The "Delete" button deletes the assignment.

Dialog box 300 may operate in different ways and have various defaults. In one embodiment, dialog box 300 has the following default functionality. If a source is entered in box 316 or box 320 is checked, then reserve pin box 322 is automatically checked. If box 322 is unchecked, or the reserve status of the pin is changed to something other than as shown, then source box 316 is blank and box 320 is unchecked. Should multiple pins be selected in window 320, then pin name 314, browse 318, reserve pin box 322, and other buttons may be disabled and/or blanked. In this situation, the only control available to the user in box 312 would be enable box 320 to enable or disable all selected pins. In certain situations, the controls in 312 may be disabled, for example, if an output pin is of an unsupported type, the pin is currently being used, the device is not supported, or a needed compiler setting has not been turned on.

Figure 5:
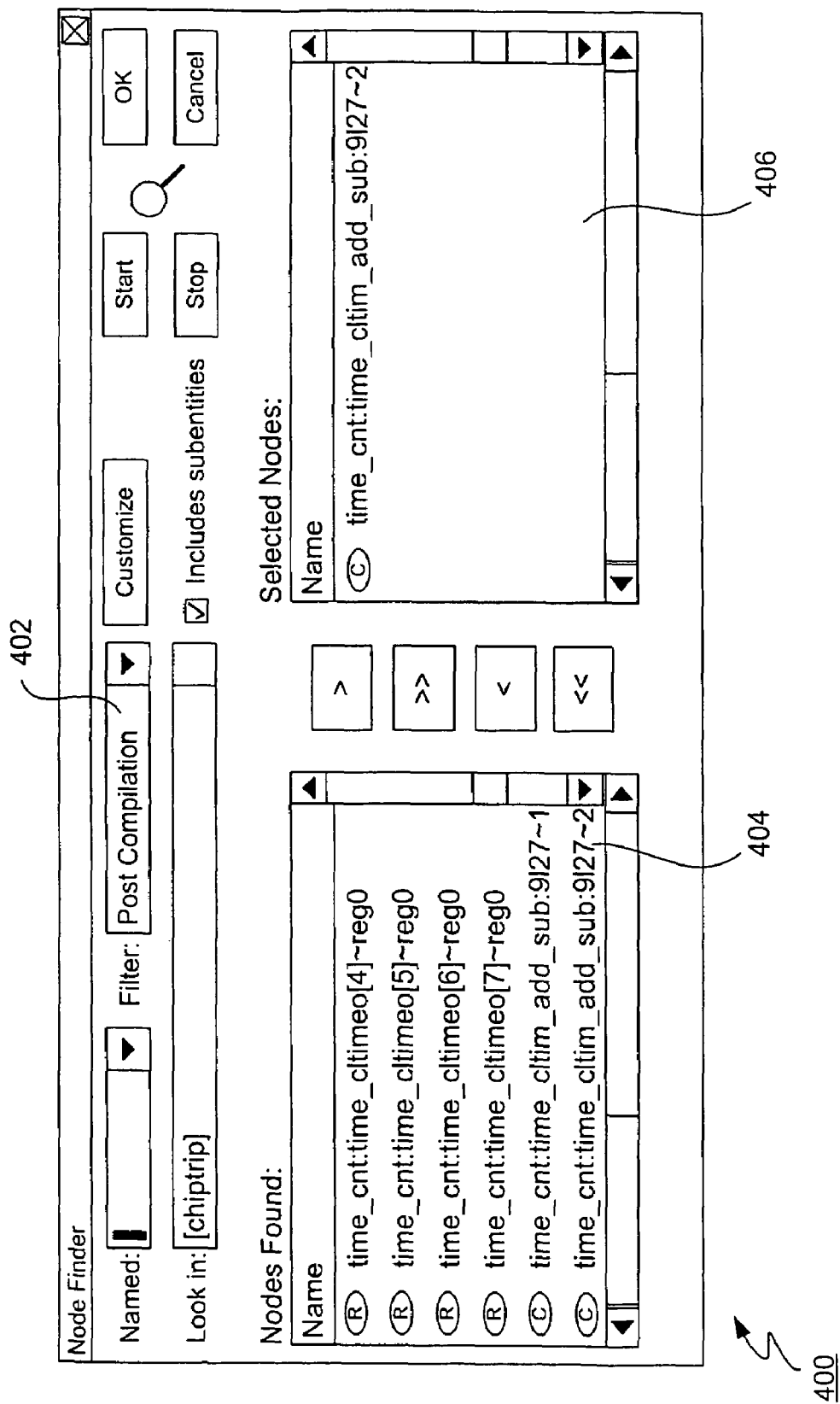
FIG. 5 is a node finder dialog box according to one embodiment of an EDA tool interface.

FIG. 5 is a node finder dialog box according to one embodiment of an EDA tool interface. This dialog box may be used in step 224 for the selection of an internal signal for debugging. Node finder dialog box 400 is opened upon the user selecting browse button 318 of FIG. 4. In this dialog box, the user may choose an internal node to be routed out to the current pin of box 312. In one embodiment, only certain nodes are available. By way of example, filters 402 may be specified to limit the available nodes. Preferably filters ensure that the return node is not a group or a bus, is not an output pin, and is post-compilation. In one embodiment, these filters are specified by the user, although the tool may also check the validity of the returned node. The tool may generate a warning message should an invalid node be selected or may disable selection of that node. Return nodes are shown in window 404, and a user may select a node in window 406. If one more than one node is selected, only the first node on the list will be returned and a warning box will inform the user. A particular source node chosen may be repeated as the source node for any number of different output pins.

As an alternative to the graphical user interface described above and shown in FIGS. 4 and 5, the user may give commands to the EDA tool using textual input, for example, by using a script. In one alternative embodiment, the EDA tool provides a TCL-based (Tool Command Language) interface which can implement equivalent GUI operations, e.g., making assignments, reserving pins, and controlling compiler flow.

To make an assignment using such a script, there is provided a valid pin name, a source pin name, a pin location and an enabling status. Such an assignment may appear as follows:

cmp add_assignment proj " " pin_name LOCATION Pin_location cmp add_assignment proj " " pin_name SIGNAL_PROBE_SOURCE source_name cmp add_assignment proj " " pin_name RESERVE_PIN "AS SIGNALPROBE OUTPUT"

cmp add_assignment proj " " pin_name SIGNAL_PROBE_ENABLE "ON"

To enable the routing of signals during compilation automatically and to start incremental compilation, the following two commands may be given respectively:

cmp add_assignment proj " " " " " " SIGNAL_PROBE_COMPILE ON cmp start SignalProbe Other techniques for inputting commands are also possible.

Incremental Recompile

Figure 6:
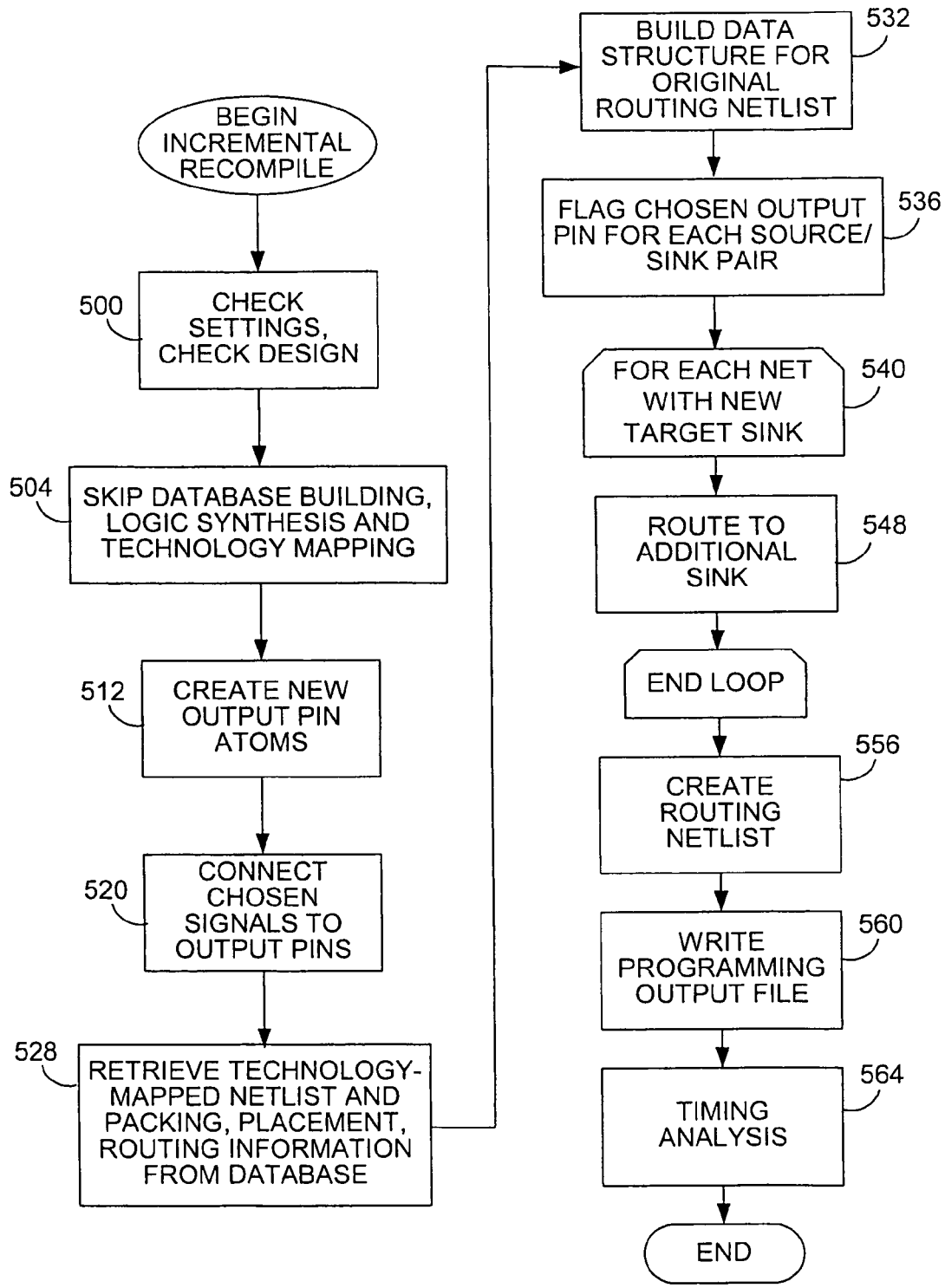
FIG. 6 is a flow diagram describing the incremental recompile step of FIG. 3.

FIG. 6 is a flow diagram describing the incremental recompile step of FIG. 3. In this step, the previously saved technology-mapped netlist and the place and route information are retrieved in order to recreate the routing netlist. The new assignments for the internal signal debugging are incrementally added to create a final output.

In step 500, the "save netlist" option will be checked to make sure that the technology-mapped netlist from the full compile had been saved into the database. Saving the technology-mapped netlist in this way allows the recompile to execute much more quickly. Other settings may be checked such as the level of optimization to be done during the compilation. Checking of the design is also performed to ensure that the user has not changed code in the files, the device family, or the device. If the design has been changed in this way, a full recompile would be performed. Assuming that the technology-mapped netlist had been saved, the database building and logic synthesis stages may be skipped, and the incremental recompile may move directly to the fitting stage.

In step 512 new atoms (device components) are created for each new output pin chosen by the user to output a debugging signal. In step 520, the chosen internal signals are connected to the new atoms representing the output pins and the resulting netlist is checked to make sure there are no errors. The result is a "legal netlist" which is the original technology-mapped netlist plus the new atoms and connections added.

In step 528, the original technology-mapped netlist along with packing, placement and routing information is retrieved from the database. Preferably the placement and routing information saved into the database is the minimum information needed to later restore and to rebuild the routing netlist. The storage of packing information is optional. Next in step 532, the original routing netlist is rebuilt using the retrieved technology-mapped netlist and the placement and the routing information. The result is the original fitter output not including the new debugged signal assignments.

In step 536, the output pin for each source/sink pair is flagged. These pins are flagged so that the fitter will know that it has new connections to route. The loop beginning at 540 routes these new signal debugging connections in conjunction with the original routing netlist. In this loop the fitter will loop through each net of the netlist to determine if the net has a new connection, i.e., if there is a source node which must be routed to an output pin. In general, during loop 540 those nets which are sourced from nodes selected by the user have their trace head structures updated. For each of these nets, the goal is not to change what is there but to add to it.

In step 548 for each net the internal signal for debugging is routed to the additional flagged output sink. In general, the fitter finds the optimal physical connection route on the device to route the internal signal to the output pin. A wide variety of routing algorithms may be used. By way of example, a standard routing technique such as a modification of Dijkstra's algorithm may be used (also referred to as an "A* search").

Those nets that do not include either an internal signal to be routed or a flagged output pin would not need to be processed in this loop. In other words, all nets other than the ones with flagged outputs are skipped as they are already routed. A re-route of those remaining nets is forced. The net corresponding to a source signal is reconstructed as per the last successful compilation from the trace data saved in the database. This reconstruction would not include the route to the flagged output pin, but the pin is marked as a target for the net. In the expansion to find a route to this target, routing resources nodes that already have an occupancy to capacity are skipped, thus no existing routing is affected. Some routing constraints (e.g., bounding box) may be relaxed for this routing.

In one embodiment, a function is called for those nets which are sourced by nodes selected by the user to be routed out. Preferably, the pins are ordered such that the output pins are last. Instead of reviewing the whole net, data structures are built as they would have been after routing the net in the original compilation and then the normal algorithm is used to route out to the final sinks. It is preferable not to disturb other nets; to that end it is desirable to not include routing resources that already full to capacity. It is possible that a user may add more than one connection from a particular net.

The new routing may be added as follows: for each net to be processed, the first sinks on the net are the sinks that were there for the original compilation. The last sinks are the new sinks for the additional debugging routing. Before applying the routing algorithm, the route tree structure is set up as it was for the original compilation. The standard routing algorithm then routes out the chosen internal signals. One modification of the standard routing algorithm is that a "no over use" parameter is set to stop the inclusions of any routing resources that are already used to capacity.

In one embodiment, the compilation flow will be the same up through the end of the fitting step and then the flow will loop back through the fitter to add the extra routing and selected output pins before continuing through the remaining compilation steps.

As a result of this loop, in step 556 a new routing netlist has been created that includes not only the original routing netlist created during the full compile, but also new connections that routes the internal signals of interest to particular output pins. This routing netlist output from the fitter includes the physical routing elements as well.

After fitting, in step 560 an assembler uses the routing netlist and routing elements to produce a bit stream for programming the hardware device, such as a PLD. This bit stream is typically written into a programming output file (POF) which is saved for later programming of the hardware device. In step 564, timing analysis may be performed in which the delay paths through the electronic design are recalculated to provide the signal delays for the user. This step insures that the timing constraints for the device are still satisfied and that the device will still perform at the speed desired after routing as the addition of any new routes to output pins may affect delays on the net. In addition, this step provides the timing delay from the internal signal of interest to its appearance at the output pin to assist with debugging. After this step, the incremental recompile is finished.

Incremental Recompile Examples

Figure 7:
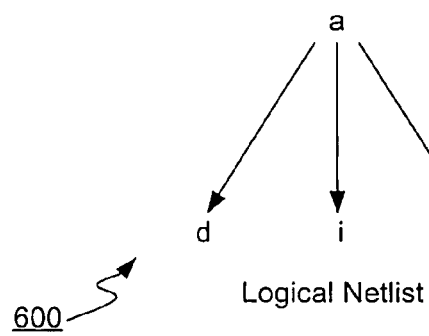
FIG. 7 illustrates a simple technology-mapped netlist which is output from the logical synthesis stage to be input to the fitting stage.

The following examples illustrate how an incremental recompile adds new routing without changing the existing routing. FIG. 7 illustrates a simple logical netlist 600 (technology-mapped netlist) which is output from the logical synthesis stage to be input to the fitting stage. In this simple example, atom A is routed logically to atoms D, I and K. Node A is an internal signal (a source) to be probed and has three sinks, namely D, I and K.

Figure 8:
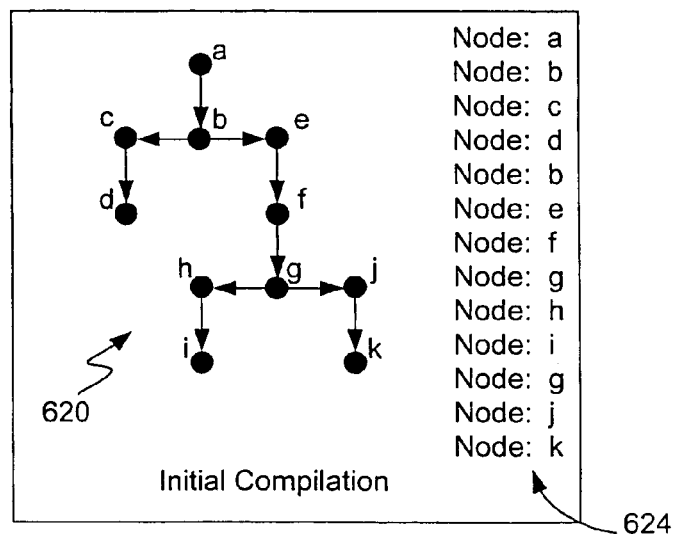
FIG. 8 illustrates an example routing netlist after a full compilation of the netlist of FIG. 7.

FIG. 8 illustrates an example routing netlist 620 after a full compilation of logical netlist 600. Netlist 620 is the output of the fitting stage. List 624 is a simplified text representation of the routing netlist that lists the nodes and describes their connections. Assuming that it is desired to route signal A to an output pin for viewing, the user performs an incremental recompile in order to route signal A to an output pin.

Figure 9:
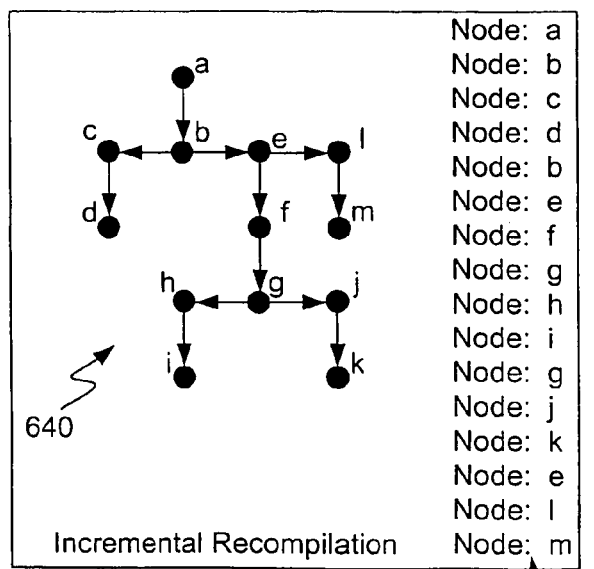
FIG. 9 illustrates the result of an incremental recompilation for the netlist of FIG. 8.

FIG. 9 illustrates the result of an incremental recompilation for the netlist of FIG. 8. New routing netlist 640 has additional node L and output M. List 644 is a simplified text representation of netlist 640. Note that as a result of the incremental recompilation, the original netlist 620 has not been modified itself, but has an added connection. In this example, the routing algorithm has determined that the optimal path to route signal A to M is via existing node E and a new node L. In this fashion, the existing placing and routing is preserved yet the internal signal of interest is still routed to an output pin for debugging.

Figure 10A:
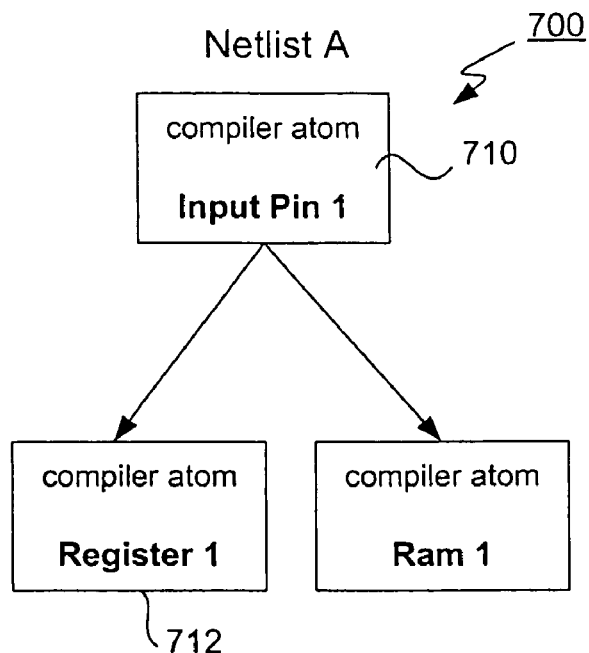
FIG. 10 illustrates a simple technology-mapped netlist which includes two nets.
Figure 10B:
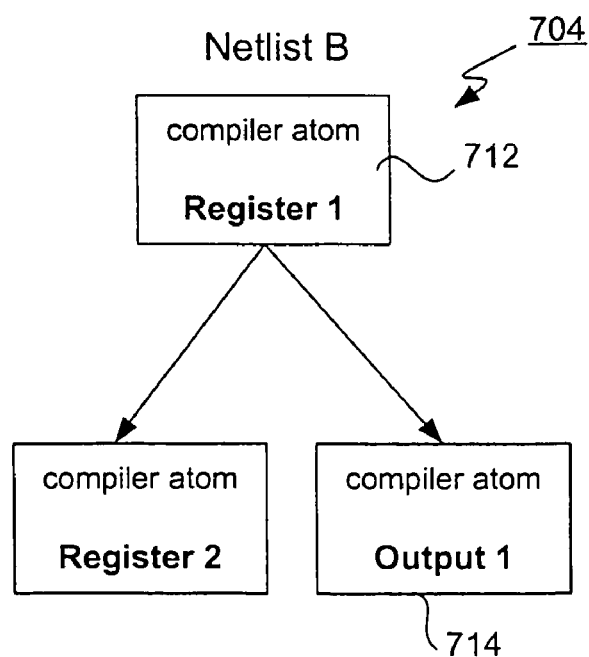

FIG. 10 illustrates a simple technology-mapped netlist which includes two nets 700 and 704. In this simple example, input pin 710 is logically routed to register 712, which in turn is routed to a register 2 and an output 714. These netlists are inputs to the fitter for placing and routing. FIG. 11 is the routing netlist resulting from the compilation of the netlist of FIG. 10 and includes two routing netlists 720 and 724. This routing netlist indicates how nodes are connected by reference to physical routing elements and their interconnections. In this example, input pin 730 is eventually routed to the input of register 732, which in turn is routed via its output 734 to an output 736. These figures illustrate a simple example of how a routing netlist may appear before application of the present invention. Of course, the present invention is applicable to much more complex designs.

FIG. 12 illustrates the technology-mapped netlist of FIG. 10A in which it is desired to view input signal 710 on the output 752 of a hardware device. The user has determined that signal 710 should be viewed, yet does not wish to perform a full recompile. Accordingly, the technique of the present invention has added a link from pin 710 to output 752 in this logical representation. Incremental compilation is then completed resulting in the following figure.

Figure 13:
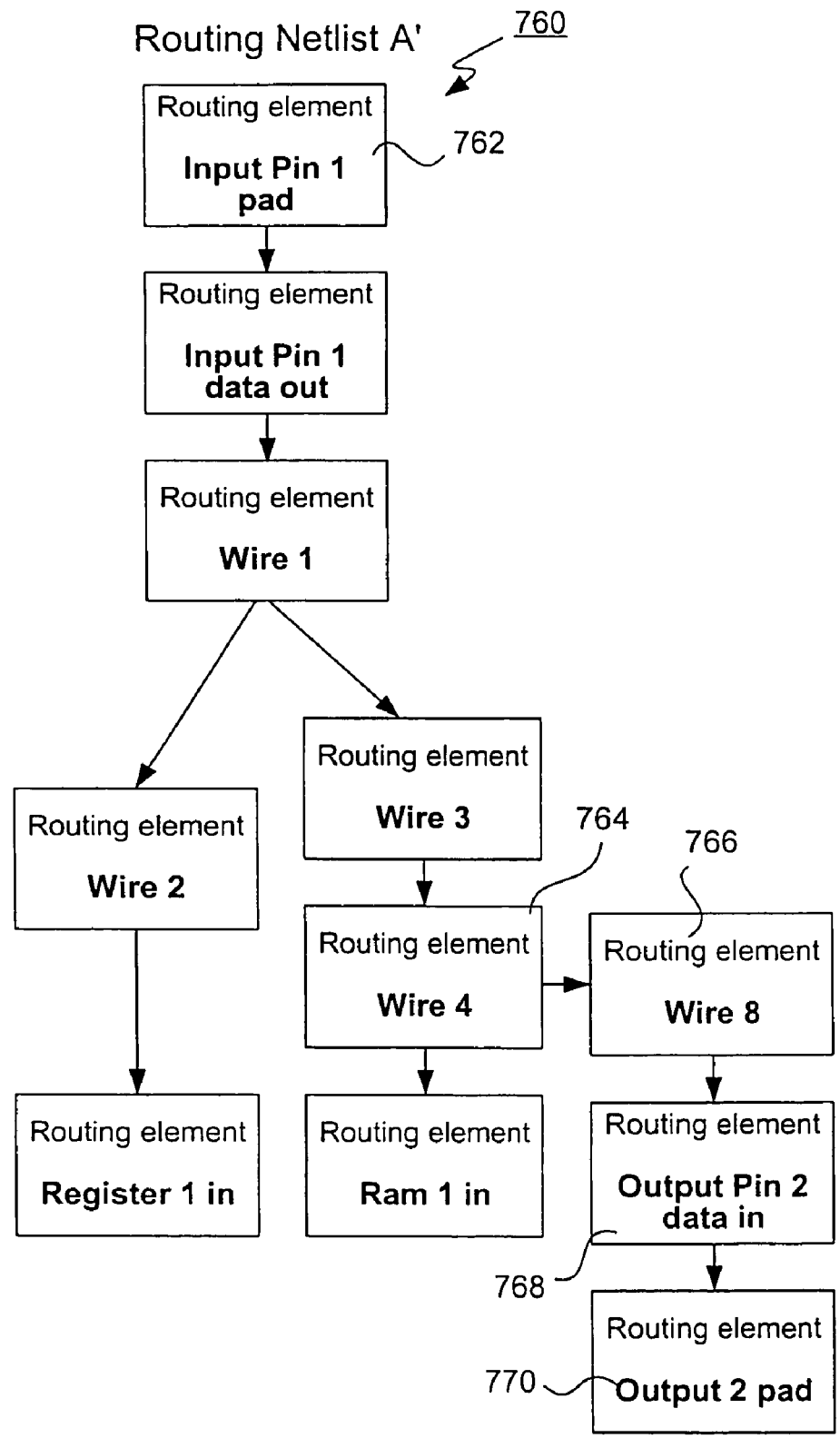
FIG. 13 is the resulting routing netlist from the netlist of FIG. 12.

FIG. 13 is the resulting routing netlist 760 from logical netlist 750. Input pin 762 is the physical element corresponding to compiler atom 710, and output pad 770 is the physical element corresponding to compiler atom 752. Note that in this example, signal 762 is routed via wire 764 and via nodes 766 and 768 before being output to pad 770. In this fashion, the existing routing netlist 720 of FIG. 11A remains unchanged, albeit for the simple additions of elements 766-770 which allow for signal 762 to be routed to an output pad. Advantageously, the fitter has routed signal 762 for viewing without disturbing previous fitter results.

Computer System Embodiment

Figure 14A:
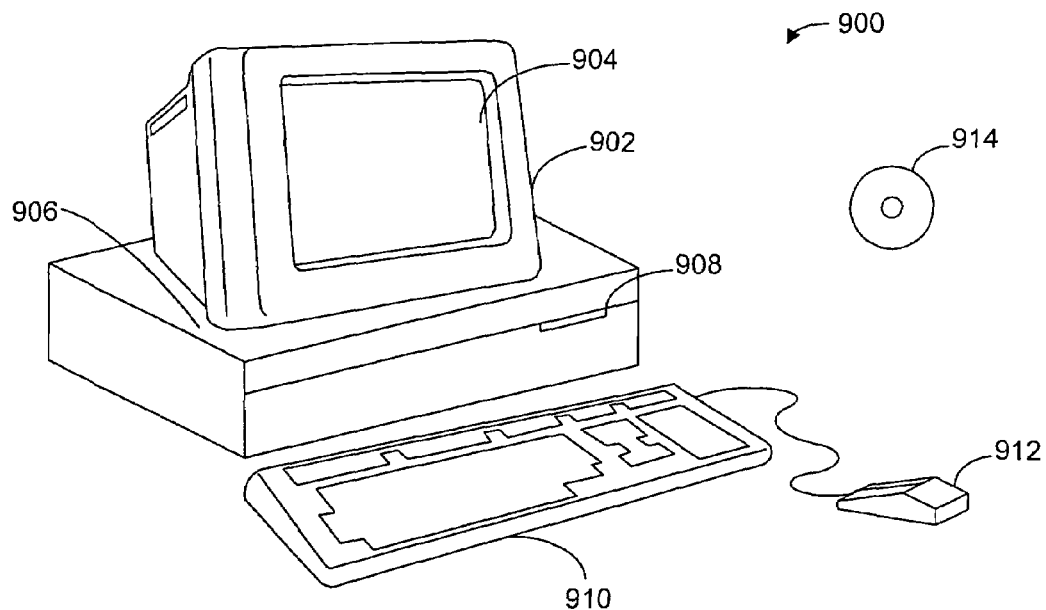
FIGS. 14A and 14B illustrate a computer system 900 suitable for implementing embodiments of the present invention.
Figure 14B:
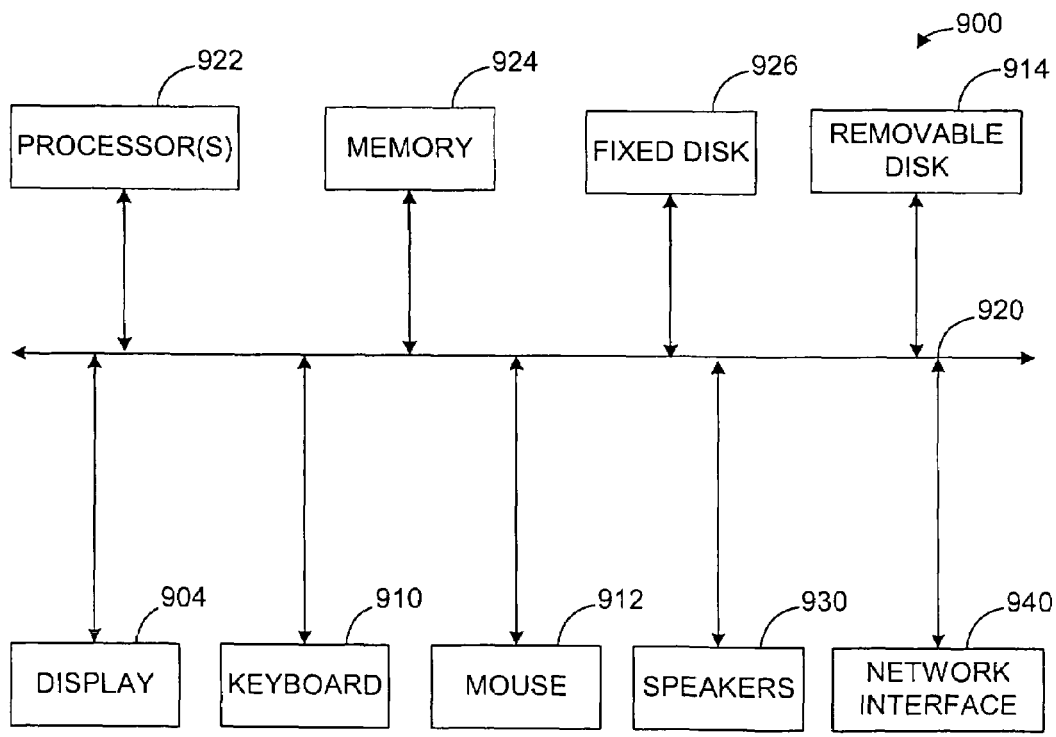

FIGS. 14A and 14B illustrate a computer system 900 suitable for implementing embodiments of the present invention. FIG. 14A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the invention is applicable to integrated circuits, and circuit boards as well as PLDs. Also, any number of internal signals may be chosen, and outputs may be rearranged to accommodate debugging. Therefore, the described embodiments should be taken as illustrative and not restrictive, and the invention should not be limited to the details given herein but should be defined by the following claims and their full scope of equivalents.

We claim:

1. A method of performing an incremental recompile of a compiled design comprising:
    skipping database building, logic synthesis and technology mapping stages of a full compilation;
    creating an atom for a chosen output pin;
    connecting an internal signal to be viewed to said output pin atom;
    building an original routing netlist for said compiled design;
    routing said internal signal to an output pin of said design without changing said original routing netlist to create a final routing netlist; and
    outputting said final routing netlist into a programming output file (POF) in a form suitable for programming, whereby said design is debugged using said internal signal.

2. A method as recited in claim 1 further comprising:
    retrieving from a database a technology-mapped netlist and placing and routing information corresponding to said compiled design to assist with said step of building the original routing netlist, whereby said incremental recompile takes substantially less time than an initial compilation of said compiled design.

3. A method as recited in claim 1 further comprising:
    downloading said POF onto a PLD, whereby said compiled design is tested on said PLD.

4. A method as recited in claim 1 further comprising:
    reserving said chosen output pin before performing an initial compilation of said compiled design, whereby a user specifies said output pin before said initial compilation.

5. A method as recited in claim 1 further comprising:
    deleting said routing from said internal signal to said output pin; and
    recompiling said compiled design, whereby said routing to aid in debugging is removed from said compiled design.

6. A method as recited in claim 1 wherein the recited steps of claim 1 are performed in a system by an electronic design automation (EDA) tool.

7. A method as recited in claim 1 wherein said design is intended for a programmable logic device (PLD), a chip, or a circuit board.

8. A computer-readable medium comprising computer code for performing an incremental recompile of a compiled design, said computer code of said computer-readable medium effecting the following:

skipping database building, logic synthesis and technology mapping stages of a full compilation;

creating an atom for a chosen output pin;

connecting an internal signal to be viewed to said output pin atom;

building an original routing netlist for said compiled design;

routing said internal signal to an output pin of said design without changing said original routing netlist to create a final routing netlist; and outputting said final routing netlist into a programming output file (POF) in a form suitable for programming, whereby said design is debugged using said internal signal.

9. The medium as recited in claim 8, said computer code further effecting:

retrieving from a database a technology-mapped netlist and placing and routing information corresponding to said compiled design to assist with said step of building the original routing netlist, whereby said incremental recompile takes substantially less time than an initial compilation of said compiled design.

10. The medium as recited in claim 8, said computer code further effecting:

downloading said POF onto a PLD, whereby said compiled design is tested on said PLD.

11. The medium as recited in claim 8, said computer code further effecting:

reserving said chosen output pin before performing an initial compilation of said compiled design, whereby a user specifies said output pin before said initial compilation.

12. The medium as recited in claim 8 further comprising computer code for effecting:

deleting said routing from said internal signal to said output pin; and recompiling said compiled design, whereby said routing to aid in debugging is removed from said compiled design.

13. The medium as recited in claim 8 wherein the recited actions of claim 8 are performed in a system by an electronic design automation (EDA) tool.

14. The medium as recited in claim 8 wherein said design is intended for a programmable logic device (PLD), a chip, or a circuit board.

* * * * *